US011967460B2

(12) United States Patent
Bölling et al.

(10) Patent No.: US 11,967,460 B2
(45) Date of Patent: Apr. 23, 2024

(54) ELECTROMAGNETIC ACTUATOR WITH INTERMEDIATE POSITION

(71) Applicant: ETO MAGNETIC GMBH, Stockach (DE)

(72) Inventors: Sebastian Bölling, Uhldingen-Mühlhofen (DE); Patrick Moll, Rulfingen (DE)

(73) Assignee: ETO MAGNETIC GMBH, Stockach (DE)

( * ) Notice: Subject to any disclaimer, the term of this patent is extended or adjusted under 35 U.S.C. 154(b) by 27 days.

(21) Appl. No.: 17/782,301

(22) PCT Filed: Dec. 4, 2020

(86) PCT No.: PCT/EP2020/084694
§ 371 (c)(1),
(2) Date: Jun. 3, 2022

(87) PCT Pub. No.: WO2021/110944
PCT Pub. Date: Jun. 10, 2021

(65) Prior Publication Data
US 2022/0384079 A1 Dec. 1, 2022

(30) Foreign Application Priority Data
Dec. 6, 2019 (DE) ..................... 10 2019 133 333.4

(51) Int. Cl.
*H01F 7/16* (2006.01)

(52) U.S. Cl.
CPC ... *H01F 7/1646* (2013.01); *H01F 2007/1669* (2013.01)

(58) Field of Classification Search
CPC ............ H01F 7/1646; H01F 2007/1669; F01L 2013/0052; F01L 2013/101; F01L 2301/00; F01L 2820/01
See application file for complete search history.

(56) References Cited

U.S. PATENT DOCUMENTS

2012/0152193 A1* 6/2012 Schiepp .................. F01L 1/047
123/90.15

FOREIGN PATENT DOCUMENTS

DE 3925137 A1 2/1990
DE 20114466 U1 1/2002
(Continued)

OTHER PUBLICATIONS

DE Search Report dated Sep. 16, 2020 issued for corresponding German Patent Application No. 102019133333.4.
(Continued)

*Primary Examiner* — Bernard Rojas
(74) *Attorney, Agent, or Firm* — Bachman & LaPointe, P.C.

(57) ABSTRACT

An electromagnetic actuating device (10) has an energizable stationary spool element (1) having a stationary core area (2), an anchor unit (3) moveable relative to the spool elements (1) and the core area (2) and has permanent magnet elements (4) and a pestle (5) disposed on one end and having a free end section (5*a*) for engaging in an actuating partner, the anchor unit (3) being moveable along a longitudinal movement axis (L) in at least two actuating positions (A,B), and the actuator (10) having retaining elements (7) which are spaced apart from the core area, are permanent-magnetically flux-conductive and are formed in such a manner in a third actuating position (C) between the first and second actuating positions (A,B) for interacting with the permanent magnet elements (4) of the anchor unit (3) that the anchor unit is retained in a third actuating position (C) between the first and second actuating positions (A,B) and/or exerts a predefined force potential towards the actuating partner.

21 Claims, 5 Drawing Sheets

(56) References Cited

FOREIGN PATENT DOCUMENTS

| | | | |
|---|---|---|---|
| DE | 102008000534 | A1 | 9/2009 |
| DE | 202009011804 | U1 | 1/2011 |
| DE | 102010050755 | A1 | 5/2012 |
| DE | 102015213662 | A1 | 1/2017 |
| EP | 2474009 | B1 | 1/2018 |

OTHER PUBLICATIONS

International search report for PCT/EP2020/084694 dated Mar. 18, 2021.

* cited by examiner

ELECTROMAGNETIC ACTUATOR WITH INTERMEDIATE POSITION

BACKGROUND

The present invention relates to an electromagnetic actuator. In particular, the present invention relates to an electromagnetic actuator for providing an intermediate position besides a retracted and extracted position.

Electromagnetic actuators as actuators for varying actuating tasks in the field of motor vehicles are sufficiently known from the state of the art. In DE 20 114 466 U1, for instance, the actuators generally comprise energizable stationary spool elements, anchor elements which are mounted so as to be axially moveable thereto and are connected to a pestle which is drivable along the pestle direction and is movable out of the actuator casing in reaction to the spool elements being energized.

Such actuators are used in particular when displacing cam shafts of a combustion engine, the pestle of the actuator being selectively engaged with a shifting gate of a sliding cam. For attaining shorter shifting times while simultaneously providing the option for commercial series production, it has proven advantageous if actuators of this kind are provided with permanent magnets on the anchor side, the permanent magnets interacting in a repelling manner with the energized spool elements. Providing spring elements in the actuator is also known, the spring elements also supporting the repelling of the anchor from the energized spool elements or from the core unit connected thereto. The spring element moreover permits a bistable embodiment of the actuator without a further power supply to the spool elements, the anchor unit or a pestle connected thereto remaining in the extracted state once the spring force has become stronger than an attractive force or retaining force of the permanent magnets acting between the anchor and the core unit.

Also known are actuators which, besides a retracted and an extracted position of the pestle, also provide a third intermediate position. These actuators find use for tasks during which the pestle is to selectively engage in two grooves or shifting gates disposed at different distances to the actuator body. Hence, EP 2 474 009 B1 discloses an actuator having a core area which comprises discs on both ends which are permanent-magnetically flux-conductive and interact with permanent magnet elements on both ends, and none of these permanent magnet elements adheres to the core area in the third actuating position via opposing attractive forces.

A disadvantage of this known state of the art are the complex arrangements of components, the higher production costs resulting therefrom and the comparatively large space required by the actuator.

SUMMARY OF THE INVENTION

The object of the invention at hand is therefore to overcome the disadvantages of the state of the art mentioned above or at least significantly downscale the negative effects. In particular, an improved electromagnetic actuator is to be provided by means of which a third actuating position preferably can be selectively approached or provided other than only a first and second actuating position. At the same time, additional constructive effort when realizing an actuator of this kind and in particular a larger construction space or space requirement is to be minimized or avoided for the device.

This object is attained by the subject matter disclosed herein. The dependent claims and disclosure provide advantageous embodiments of the present invention.

In a first aspect, the invention relates to an electromagnetic actuator comprising an energizable stationary spool elements having a stationary core area assigned thereto, an anchor unit which is moveable relative to the spool elements and the core area and has permanent magnet elements and a pestle preferably disposed on one end and having a free end section for engaging in an actuating partner, in particular a guide groove of a cam shaft, the anchor unit being moveable along a longitudinal movement axis in at least two actuating positions, in particular in a first retracted actuating position and a second extended actuating position, and the actuator comprising retaining elements which are spaced apart from the core area, are permanent-magnetically flux-conductive and are formed in such a manner in a third actuating position between the first and second actuating positions for interacting with the permanent magnet elements of the anchor unit that the anchor unit is retained in a third actuating position between the first and second actuating positions and/or exerts a predefined force potential towards the actuating partner.

The phrase "toward the actuating partner" is to be understood as in particular the mustering of a force potential towards an actuating partner, such as a guide groove, in particular towards a contact surface, such as a groove bottom of the guide groove. In this context, the provided force potential or the pressing force of the free end section of the pestle is rigidly held in the guide groove or is pressed against the groove bottom. The force potential preferably acts coaxially or parallel to the longitudinal movement axis, preferably in an extracting direction of the pestle. Alternatively, following the same active principle, a force potential can be provided towards a differently shaped or differently disposed surface or contact surface of an actuating partner assigned to the actuator in the third actuating position. In this instance, depending on the arrangement of the actuator and the actuating partner assigned thereto and on the manner in which the free end section of the pestle is realized, the force potential can also be available or exerted in the retreating direction of the pestle along the longitudinal movement axis. For instance, if the free end section is swallow tailed, which has a circumferential notch, a force potential can act between a surface of the notch and a surface or contact surface of the actuating partner assigned thereto.

The anchor unit of the device preferably comprises permanent magnet elements merely disposed on one end. The permanent magnet elements preferably comprise several disc-shaped permanent magnets which can be axially disposed in a row next to one another along the longitudinal movement axis. The permanent magnet elements have a preferably constant outer diameter. Moreover, disc-shaped elements made of magnetically flux-conductive material, such as iron, can be disposed on both axial ends of the permanent magnet elements.

The anchor unit of the device comprises a pestle preferably disposed on one end and having a free end section. In other words, the anchor unit has merely one pestle, which extends axially towards an opposing end of the anchor unit along the longitudinal movement axis from the permanent magnet elements preferably disposed on one end.

The pestle of the anchor unit is preferably concentric with the permanent magnet elements. The pestle preferably extends from one end of the permanent magnet elements towards an actuating partner and can be realized integrally with the permanent magnet elements, for example, or be realized as a separate component adhering thereto magnetically. The pestle preferably has a constant outer diameter.

The device preferably comprises only one spool unit or spool elements which is/are assigned to the corresponding stationary core area. The only one spool unit is preferably disposed on the end of the device opposite the free end section of the pestle. The spool elements or spool unit is preferably connected to control elements, which are selectively connectable to the actuator or can be formed integrally with actuator. The control elements are preferably designed for selectively providing a predefined energization of the spool elements, in particular a pulse-shaped application of current preferably having a variable length. The spool elements preferably have only one spool winding. This means that in addition to the provided spool winding, no other winding, in particular no other spool winding directed in a different direction, is provided. This permits minimizing the space required and the weight of the electromagnetic actuator.

In a preferred embodiment, the anchor unit is designed in such a manner for interacting with the spool elements and the core area that the anchor unit is moved from the first to the second or third actuating position as a reaction to the spool elements being selectively energized, in particular by choosing a corresponding duration of the energization. For instance, an energization can last for 10 ms to 100 ms. In order to move the anchor unit to the third intermediate actuating position, a short current pulse of 5 ms to 25 ms, more preferably 10 ms to 20 ms, can be applied, for example. In order to move the anchor unit to the second extracted actuating position, a relatively longer current pulse of, for example, 20 ms to 100 ms, more preferably 25 ms to 75 ms, can be applied.

When a pulse-shaped current is applied to the spool elements, a homopolar magnetic field is generated or forms in this instance for each permanent magnet element of the anchor unit, the magnetic field acting against the field of the permanent magnet elements otherwise adhering to the core area and thus leading to a repelling of the permanent magnet elements from the core area and the spool elements. When the anchor unit reaches or takes up the corresponding actuating position, for example owing to the pestle or the free end section of the pestle making contact with a correspondingly distanced groove bottom of an actuating partner, the energization is preferably definitely terminated.

In a preferred embodiment, the third actuating position is kept stable without energy in an unenergized state of the spool elements via the permanent magnet elements interacting with the retaining elements. In the first retracted actuating position, the anchor unit is preferably kept stable without energy in the unenergized state of the spool elements via the permanent magnet elements interacting with the core area. The second extracted actuating position is preferably kept stable without energy via the permanent magnet elements interacting with a guide element of the device, which is disposed opposite the core area in the device and preferably consists of magnetically flux-conductive material. The guide element preferably serves for guiding the pestle and/or the anchor unit. For instance, the anchor unit can also be guided or mounted in the core area and the pestle can be mounted by means of the guide element.

The present invention permits providing a third actuating position of the actuator via the magnetic interaction between the retaining elements and the permanent magnet elements in a constructive and cost-efficient manner. In particular, unlike with differently acting attenuation elements, an effective and simultaneously low-wear and low-maintenance realization of the actuator can be provided, for example by means of a structural-viscose fluid or subjecting the anchor unit to a transverse force, for example by means of a ball catching mechanism.

The retaining elements are preferably disposed along a movement section of the permanent magnet elements along the longitudinal movement axis between the first retracted and second extracted actuating position and are preferably disposed coaxial to the permanent magnet elements. The retaining elements are preferably made from a separate component, which is retained in the casing of the device at a predefined position, for example by means of corresponding mounting elements. The retaining elements alternatively can also be made integrally with casing of the device.

In a preferred embodiment, the retaining elements are realized in such a manner for interacting with the permanent magnet elements that a movement of the anchor unit along the longitudinal movement axis from the first retracted actuating position to the second extracted actuating position is dampened or weakened and/or stopped when nearing or passing through the third actuating position. Preferably, radial magnetic transverse forces occur in particular in a predefined stroke section H2 of the anchor unit, the radial magnetic transverse forces at least dampening or weakening and/or stopping the movement of the permanent magnet elements and thus of the anchor unit. Preferably, the dampening or the weakening and/or the stopping takes place in an unenergized state of the spool element, i.e., in a state in which power is no longer initially supplied to the spool elements in order to extract the anchor unit. In an energized state of the spool elements, the anchor unit preferably passes through the third actuating position essentially without resistance.

In another preferred embodiment, the retaining elements are realized in such a manner for interacting with the permanent magnet elements of the anchor unit that the anchor unit exerts a preferably essentially homogeneous force potential towards the actuating partners via a predefined stroke section H3 between the first and second actuating position. In particular in this embodiment, the retaining elements are realized in such a manner that besides a radial magnetic transverse force, an axial force acting towards the actuating partner acts or can be exerted on the actuating partner.

The third intermediate actuating position is located in the predefined stroke section H3 and can be defined via the pestle engaging in a groove bottom of an actuating partner. In particular the spool elements can be energized in such a manner that the intermediate third actuating position of the anchor unit is reached, the stroke of the anchor unit being limited by the contact with, for example, a groove bottom of the actuating partner. In this third intermediate actuating position preferably stable without energy, a preferably predefined force potential is exerted on the actuating partner. This can prevent the pestle from detaching from the actuating partner and thus effectively ensure a secure retaining of the third actuating position. Moreover, the predefined stroke section having a preferably homogeneous force potential ensures a compensatory tolerance is permitted for the installation of the device in actuation component groups.

The term “essentially homogeneous” is in particular understood to mean that the force potential varies or deviates less than 1.5 N, preferably less than 1 N, more preferably less than 0.5 N, and most preferably less than 0.3 N, across the predefined hub section.

The force potential exerted on the actuating partner preferably ranges from 0.1 N to 5 N, more preferably from 1.5 N to 3 N.

The predefined stroke section H3 having a preferably homogeneous force potential preferably has a stroke of the anchor unit and thus of the pestle along the longitudinal movement axis of 0.5 mm to 2.5 mm, more preferably of 1 mm to 2 mm.

In a preferred embodiment, the retaining elements comprise an essentially cylindrical flux-conductive element having a preferably constant inner diameter and outer diameter or are made thereof. The retaining elements are preferably disposed in such a manner in the device that they preferably surround the anchor unit in the third actuating position. The retaining element can be a cylindrical swivel. In a particularly preferred embodiment, the retaining element is a cylindrically bent or rolled sheet-metal part having a preferably constant wall thickness. The sheet-metal part is bent to its desired shape from a rectangular sheet. The retaining element preferably surrounds the permanent magnet elements around a circumference of at least 330°, more preferably at least 350°, most preferably at least 355°. Particularly preferably, the retaining elements surround the entire circumference of the permanent magnet elements, i.e., the entire circumference of 360°.

In an alternative embodiment, the retaining elements comprise an essentially cylindrical flux-conductive element having a constant outer diameter and varying inner contour. The inner contour can have a structure surface, for example. In another preferred embodiment, the inner contour has an inner diameter becoming reduced in the movement direction towards the second actuating position. The element has a cross section preferably homogeneous in relation to the circumference and in the shape of half a frustum. This shape can also be realized as a swivel. Alternatively, the retaining element can be a bent or rolled sheet-metal part having a varying cross section in relation to its circumference. In particular, one end of the sheet-metal part can have at least two, preferably several, cutouts or notches of the same type dispersed on its circumference. These cutouts or notches have an essentially triangular shape in the rolled-out state of the sheet-metal part. Alternatively, the cutouts or notches can have a different geometric shape, in particular a trapezoidal shape. In this manner, a solution, which is particularly easy to produce while simultaneously being cost-efficient, can be provided for the retaining elements.

The retaining elements preferably have a height or extension along the longitudinal movement axis, which is essentially the same or larger than the height or extension of the permanent magnet elements in the direction of the longitudinal movement axis. In an alternative embodiment, the retaining elements can also have a smaller height or extension than the retaining elements. Owing to this, the magnetic influence area of the retaining elements can be shortened along the longitudinal movement axis. The height or extension of the retaining elements is preferably between 6 mm to 14 mm, more preferably between 8 mm and 12 mm.

A radial distance between the retaining elements and the permanent magnet elements, in particular a distance between an outer circumference surface of the permanent magnet elements and an inner circumference surface of the retaining elements, is preferably between 0.2 mm and 1.4 mm, more preferably between 0.3 mm and 0.8 mm.

An axial distance between the retaining elements and the core area along the longitudinal movement axis is preferably between 1 mm and 7 mm, more preferably 3.5 and 6 mm.

In another preferred embodiment, the retaining elements interact in such a manner with the permanent magnet elements that a movement of the anchor unit along the longitudinal movement axis from the first retracted actuating position to the third intermediate actuating position is at least partially and preferably supported and/or accelerated along a predefined stroke section H1 of the anchor unit. This results in particular from an axial force component of a magnetic attractive force between the permanent magnet elements and the retaining elements, which acts on the permanent magnet elements upon leaving the first actuating position. This leads to the anchor unit being supported in its movement by the retaining element when leaving the first actuating position, whereby a shortening of the extraction movement is attained.

In a preferred embodiment, the device does not have energy storage means or spring elements, in particular between the anchor unit and the core area.

The casing of the device is preferably made of magnetically flux-conductive material.

The retaining elements are preferably disposed in the casing of the device so as to be spaced apart or, alternatively, disposed adjacent to the guide element.

The retaining element and/or the guide element are preferably made of a magnetically soft material, such as iron.

In another aspect, the invention relates to a system comprising an electromagnetic actuating device as described above and an actuating partner assigned thereto, in particular a sliding cam, comprising at least one first guide groove, preferably a known S-groove, and a second guide groove, preferably a known X-groove, which is positioned radially higher on the actuating partner in relation thereto, i.e., at a shorter distance to the actuator than the first groove.

In another aspect, the invention relates to the usage of the electromagnetic actuator as described above for displacing cam shafts on a combustion engine of a motor vehicle.

BRIEF DESCRIPTION OF THE DRAWINGS

Further advantages, features and details of the invention are derived from the following description of preferred exemplary embodiments and from the figures.

In the figures, the same elements and elements having the same function are referenced with the same numeral.

DETAILED DESCRIPTION

Figure 1A:
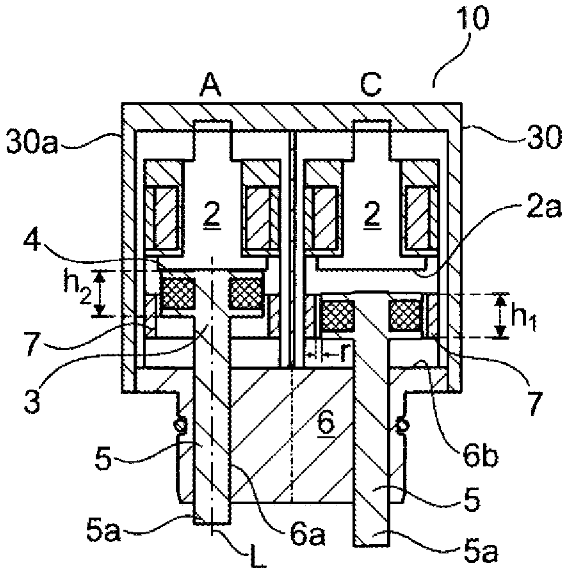
FIG. 1*a* and FIG. 1*b* each show a schematic longitudinal cut through a preferred embodiment of an electromagnetic actuator according to the present invention in different actuating positions.
Figure 1B:
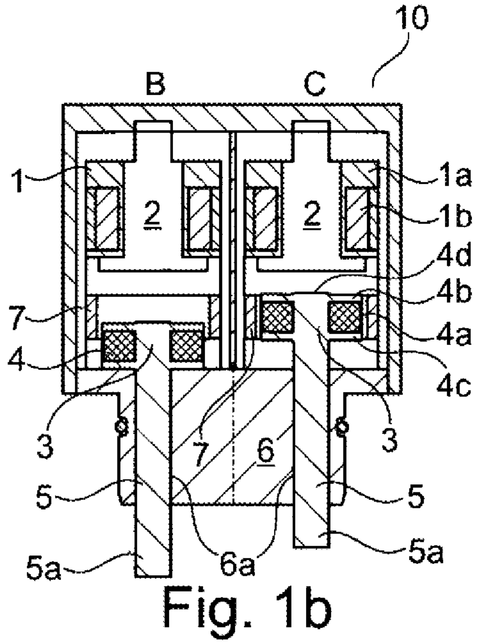

FIGS. 1*a* and 1*b* show a preferred embodiment of electromagnetic actuator 10 according to the invention in a laterally cut view. Electromagnetic actuator 10 comprises a casing 30 having a cylindrical casing section 30*a* in which further elements of the device, which will be described in the following, are disposed as a component group. Presently, two component groups each are shown beside each other in casing 30 in the corresponding figures in particular for elucidating the actuating position. However, the present invention is not limited thereto; the invention also encompasses embodiments which each have a corresponding number of component groups of the actuator. Accordingly, more than two corresponding component groups can be provided in a shared casing 30.

Actuator 10 comprises stationary energizable spool elements 1 and a stationary and magnetically conductive core area 2 assigned thereto. Spool elements 1 preferably comprise a spool body 1*a* and a spool 1*b* wound around spool body 1*a*. Actuator 10 further comprises an anchor unit 3 selectively moveable towards spool elements 1 and core area 2 along a longitudinal movement axis L. Anchor unit 3 comprises permanent magnet elements 4 and a pestle 5 having a free end section 5*a* for engaging in an actuating partner, in particular a guide groove 11*a*, 11*b* of an actuating partner 11, e.g., a cam shaft (cf. FIG. 2). Pestle 5 and permanent magnet elements 4 are preferably tightly connected to each other. In this context, permanent magnet elements 4 are preferably disposed on one end of anchor unit 3, and pestle 5 extends to the opposite end. Pestle 5 is guided on an end of casing 30 opposite spool elements 1 in a preferably cylindrical guide element 6, which is realized as a casing section on one end, for example. In particular, the corresponding pestle can be guided in an intended bore 6*a* of guide element 6. Guide element 6 can be fitted into casing section 30*a* and is preferably made of magnetically flux-conductive material.

Core area 2 has a flat inner side 2*a* and is preferably realized in such a manner for interacting with permanent magnet elements 4 that permanent magnet elements 4 adhere to core area 2 in the unenergized state (cf. FIG. 1*a*, left component group) and thus a stable first retracted actuating position A of anchor unit 3 can be provided.

Guide element 6 has a preferably flat inner side 6*b*, which is realized in such a manner for interacting with permanent magnet elements 4 in an extracted second actuating position B that permanent magnet elements 4 preferably adhere to guide element 6 in the unenergized state (cf. FIG. 1*b*, left component group) and thus a second actuating position stable without energy can be provided. Pestle 5 and consequently anchor unit 3 can be moved back from second extracted actuating position B to first retracted actuating position A in a generally known manner via a mechanical return or sliding back of the pestle by means of a change in height in a contacted groove guide or the corresponding groove bottom. Alternatively, second actuating position B can be provided by preferably continuously energizing the spool elements and thus by mustering a preferably continuous repelling force on the anchor unit. Pestle 5 can optionally be returned via a returning spring element or by means of its support.

Between permanent magnet elements 4 and core area 2, generally known antiadhesive means, such as antiadhesive discs or a central elevation 4*d*, can be provided for maintaining a predefined distance. Permanent magnet elements 4 preferably comprise at least one permanent magnet disk 4*a*, for example a neodymium-iron-boron magnet, which can be disposed centrally between two magnetically conductive disks 4*b*, 4*c* made of iron, for example. Permanent magnet disk 4*a* and adjoining disks 4*b*, 4*c* can be connected to each other by means of a thin adhesive film and/or be surrounded by a ring (not illustrated), preferably made of plastic. This plastic ring can serve to prevent material from chipping off permanent magnet disk 4*a*. Permanent magnet disk 4*a* and adjoining disks 4*b*, 4*c* can also be connected in a force or form-fitting manner using alternative connective means, e.g., by means of welding, caulking, etc.

According to the invention, the device comprises permanent-magnetically flux-conductive retaining elements 7. Retaining elements 7 are preferably disposed at a predefined axial distance d to the core area. The distance is between 1 mm to 7 mm, more preferably between 3.5 mm to 6 mm. Retaining elements 7 can be axially distanced to guide element 6, which is disposed opposite the core area, by means of distance d1. Distance d1 is preferably between 1 mm to 7 mm, more preferably between 3.5 mm to 6 mm. In a particularly preferred embodiment, retaining elements 7 are centered, i.e., disposed at half the axial distance between core area 2 and guide element 6.

A radial distance r between retaining elements 7 and permanent magnet elements 4, in particular a distance between an outer circumference surface of the permanent magnet elements and an inner circumference surface of the retaining elements, is between 0.2 mm and 1.4 mm, more preferably between 0.3 and 0.8 mm.

An extension or height h1 of retaining elements 7 along longitudinal movement axis L is preferably essentially the same or greater than the extension or height h2 of permanent magnet elements 4 towards longitudinal movement axis L. In an alternative embodiment, retaining elements 7 can also comprise a smaller extension or height h1 than retaining elements 7.

Retaining elements 7 are realized in such a manner for interacting with permanent magnet elements 4 of anchor unit 3 in a third actuating position C (cf. FIGS. 1*a* and 1*b*, right component group) that anchor unit 3 can be retained in third actuating position C between first and second actuating position A, B and/or can exert a predefined force potential towards a contacted actuating partner, as described in the following. In the illustrated embodiment, retaining elements 7 comprise an essentially cylindrical retaining element, which has a preferably homogeneous cross section.

Figure 3:
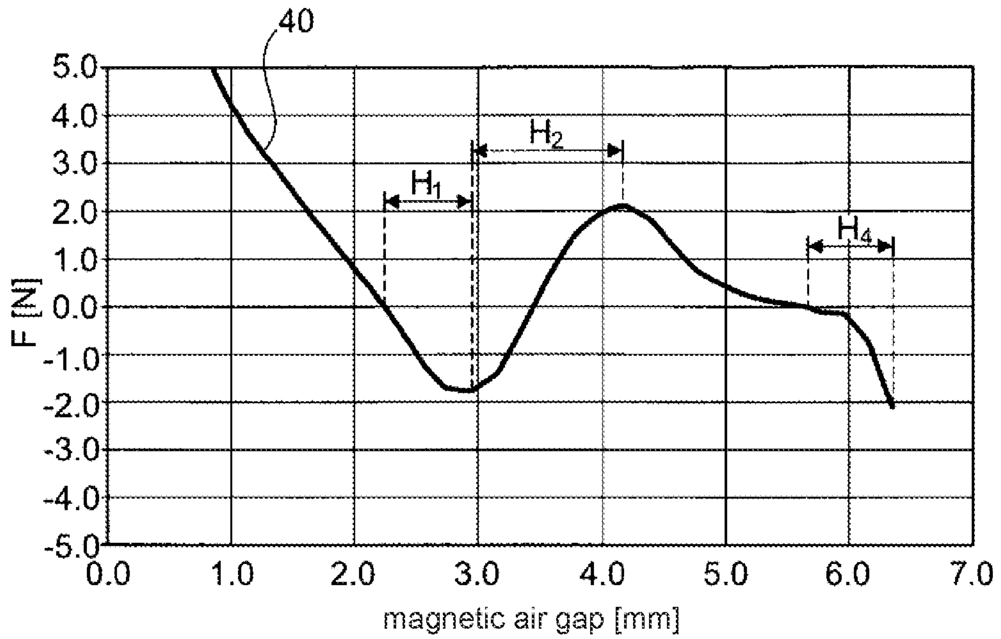
FIG. 3 shows a force-path curve according to FIGS. 1 and 2 belonging to the embodiment while the spool elements are unenergized.

During operation of actuator 10 for reaching intermediate actuating position C, a relatively short pulse-shaped current is applied to spool elements 1, whereby permanent magnet elements 4 are removed or repelled from core area 2. During a further extracting movement, anchor unit 3 is initially supported or accelerated at least partially by a forming magnetic attractive force between permanent magnet elements 4 and retaining elements 7. This takes place in particular via a predefined stroke section H1 (cf. assigned force-path curve 40 in FIG. 3). In an adjoining stroke section H2, the movement of anchor unit 3 is dampened or decelerated, in particular by radially occurring magnetic transverse forces by means of which anchor unit 3 comes to a standstill at little initial drive by means of the comparatively short pulse-shaped energization and can be retained in intermediate actuating position C by means of the interaction between permanent magnet elements and retaining elements 7. In the illustrated embodiment, anchor unit 3 is retained at a hub of approximately 3.3 mm (compare zero crossing in FIG. 3).

During operation of actuator 10 for reaching second extracted actuating position B, a comparatively longer pulse-shaped current is applied to spool elements 1 whereby permanent magnet elements 4 and thus anchor unit 3 experience a comparatively larger repelling force and a higher initial drive. This takes place in such a manner that the interaction with retaining elements 7 acting in a damping manner on permanent magnet elements 4 for this operation mode does not lead to anchor unit 3 being retained in third intermediate actuating position C but to anchor unit 3 being brought to extracted actuating position B. When anchor unit 3 nears guide element 6 disposed on one end, the anchor unit experiences an additional magnetic attractive force via the interaction between permanent magnet elements 4 and guide element 6 (cf. stroke section H4 in FIG. 3).

Figure 2:
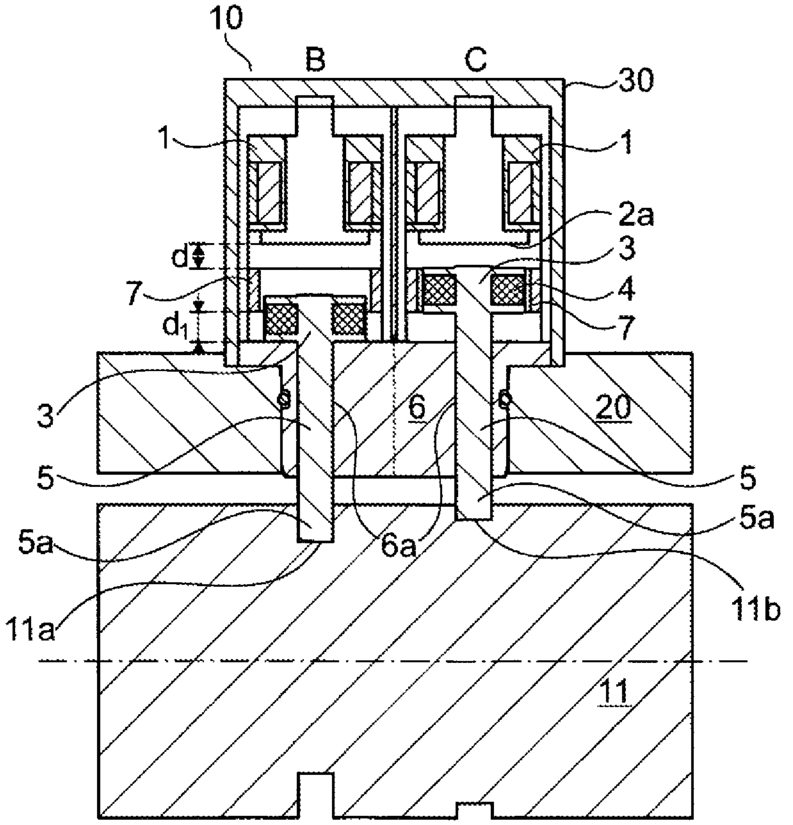
FIG. 2 shows a schematic cut side view of the electromagnetic actuator according to the invention engaged with a guide groove of a cam shaft having different actuating positions.

FIG. 2 shows a preferred embodiment of the system according to the invention consisting of actuator 10 and an assigned actuating partner 11, in particular a cam shaft. Actuator 10 can be inserted in a positioner 20 or be connected thereto as shown. Actuating partner 11 comprises at least one guide groove 11*a*, for example a known S-groove, and a second guide groove 11*b*, preferably a known X-groove, which is positioned radially higher on the actuating partner in relation thereto, i.e., at a shorter distance to actuator 10 than first groove 11*a*.

Free end section 5*a* of pestle 5 is contacted with a corresponding groove bottom of groove 11*a*, 11*b*. As FIG. 2 shows, the left component group shows second extracted actuating position B of anchor unit 3 and the right component group shows third intermediate actuating position C of anchor unit 3. By means of providing an extracted actuating position B stable without energy and an additional intermediate actuating position C stable without energy as intended by the invention, the actuator can be used for actuating processes having different groove heights and partially overlapping gate tracks of an actuating partner.

Figure 4:
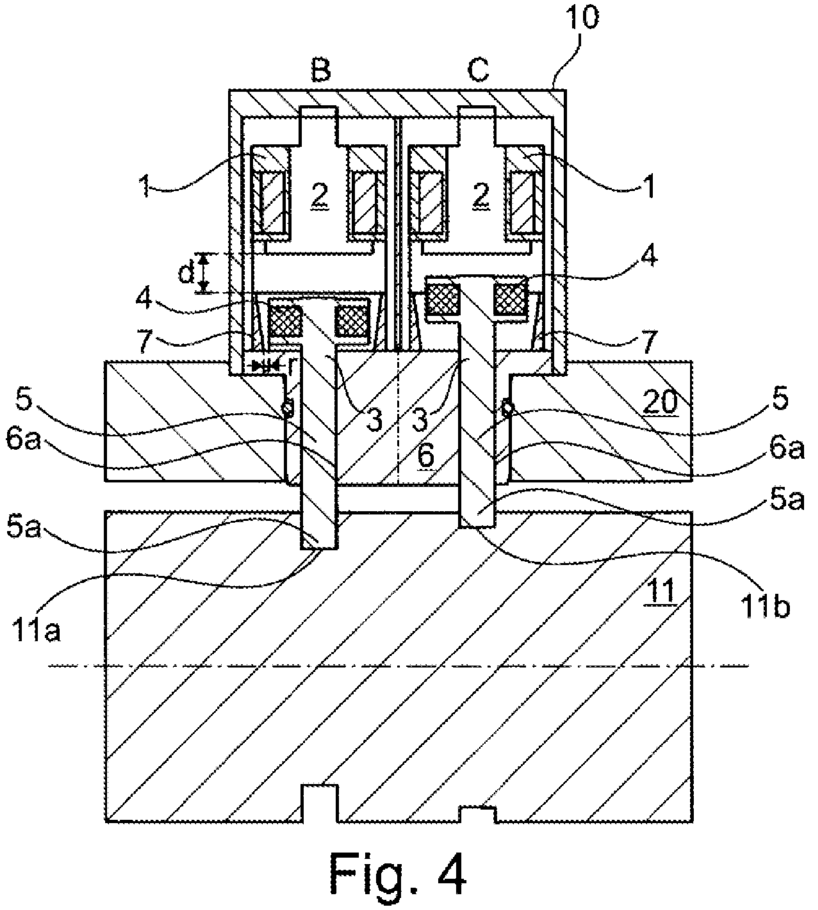
FIG. 4 shows a longitudinal cut through another preferred embodiment of an electromagnetic actuator according to the invention in different actuating positions and engaged with a guide groove of a cam shaft having different actuating positions.

FIG. 4 shows another preferred embodiment of actuator 10 according to the present invention in different actuating positions and engaged with a guide groove of an actuating partner in each instance. In this embodiment, retaining elements 7 have an alternative cross-sectional shape. In particular, retaining elements 7 are formed by an essentially cylindrical flux-conductive element having a constant outer diameter and a varying inner contour. The inner contour has an inner diameter becoming reduced in the movement direction toward second actuating position B. In relation to the circumference, retaining element 7 has a preferably homogeneous cross section in the shape of half a frustum. Retaining element 7 is located on guide element 6 or directly adjoins guide element 6 in this context.

This embodiment of retaining elements 7 enable an interaction with permanent magnet elements 4 of anchor unit 3 in such a manner that anchor unit 3 exerts a preferably essentially homogeneous force potential towards actuating partner 11 via a predefined stroke section H3 (cf. assigned curve 41 in FIG. 5) between the first and second actuating position. In particular in this embodiment, the retaining elements are realized in such a manner that an axial force acts towards actuating partner 11 or can be exerted on the actuating partner besides a radial magnetic transverse force.

Third intermediate actuating position C (right component group in FIG. 4) is located in predefined stroke section H3 and can be defined by engaging or resting pestle 5 on a groove bottom of groove 11*b*, for example. The force potential exerted on actuating partner 11 preferably ranges from 1 N to 5 N, more preferably from 1.5 N to 3 N. Predefined stroke section H3 preferably has a stroke of anchor unit 3 along longitudinal movement axis L of 0.5 mm to 2.5 mm, more preferably of 1 mm to 2 mm.

Figure 5:
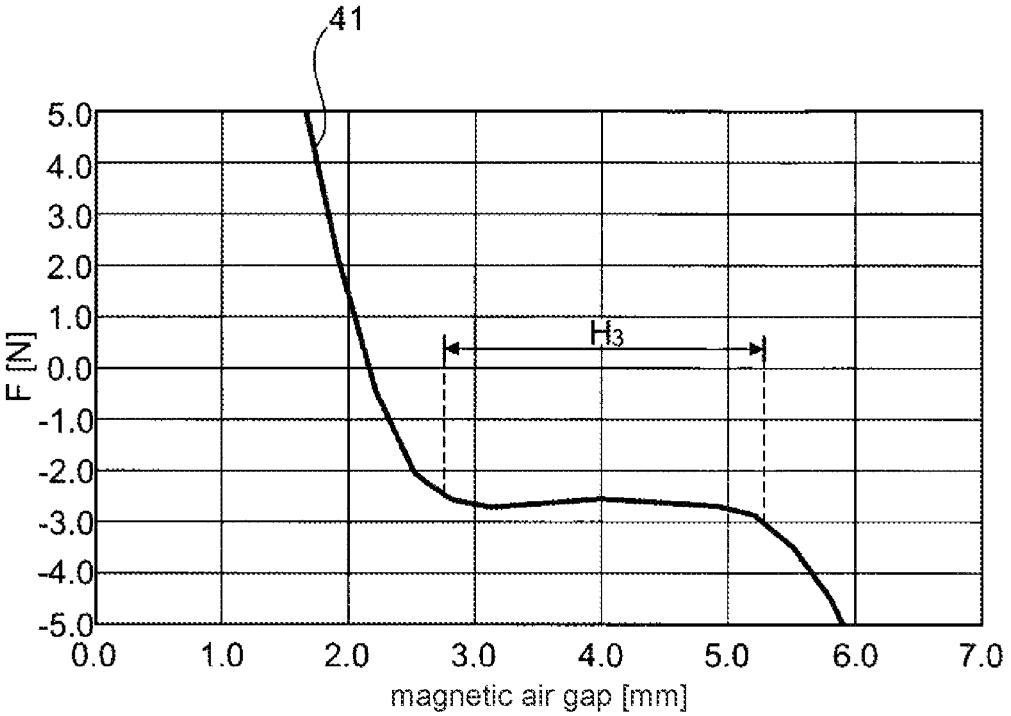
FIG. 5 shows a force-path curve according to FIG. 4 belonging to the embodiment while the spool elements are unenergized.

FIG. 5 shows a force-path curve 41 for the unenergized state belonging to the embodiment of FIG. 4.

Figure 6:
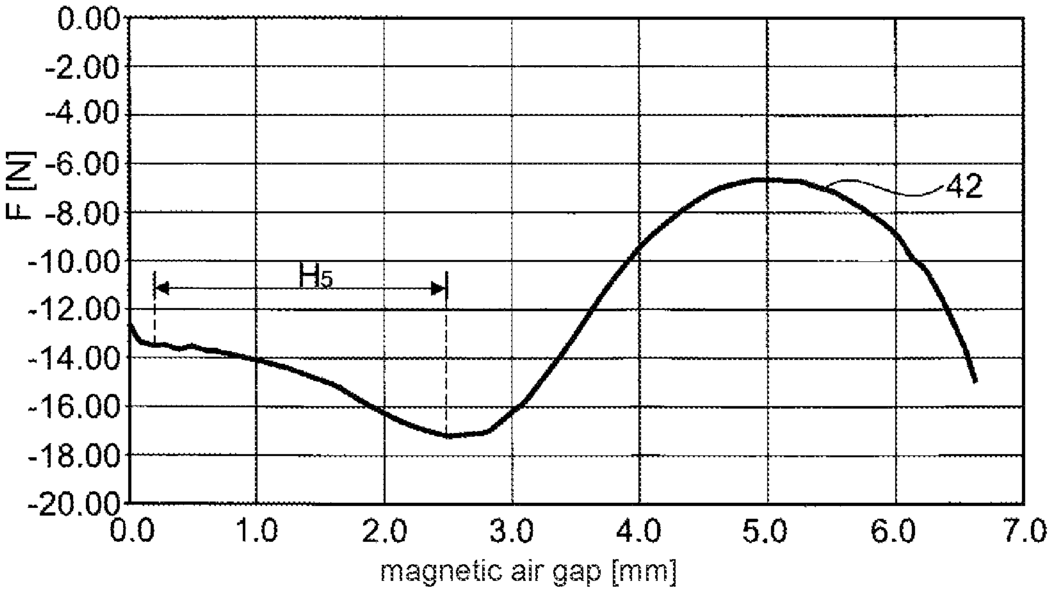
FIG. 6 shows a force-path curve according to FIG. 4 belonging to the embodiment while the spool elements are energized.

FIG. 6 shows a force-path curve 42 for the live state belonging to the embodiment of FIG. 4. As FIG. 6 shows, actuator 10 is preferably designed in such a manner that a relatively constant force potential is derived across the stroke in an initial stroke section H5. Preferably the force potential remains in a stroke ranging from 0.5 mm to 2.5 mm within a maximum deviation of 0.5 N to 4 N, more preferably 1 N to 3.5 N. This allows providing a relatively constant force potential when extracting the pestle in particular when wear occurs which leads to a displacement of the curve to the left in FIG. 6 by means of abrasion of the pestle, for example. A substantial deterioration or reduction of the force potential upon wear and consequently a reduction of, for example, the possible shifting times are prevented owing to this. This configuration enables in particular a usage of the actuator for at least 1 million cycles, more preferably 2 million cycles.

Figure 7:
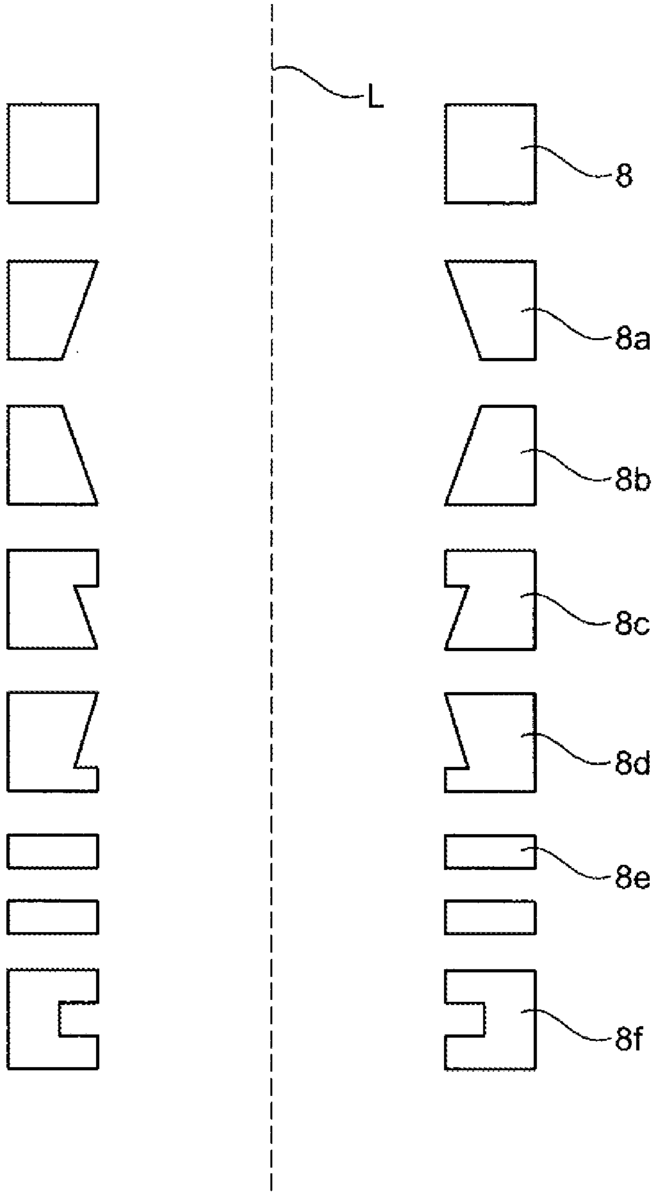
FIG. 7 shows an alternative cross-sectional shape for the retaining elements.

FIG. 7 schematically shows several alternative cross-sectional shapes 8*a* to 8*f* for retaining elements 7. Besides cylindrical or annular cross-sectional shape 8 as described above and a cross-sectional shape of half a frustum having an inner diameter 8*b* becoming reduced in the extracting direction as described above, retaining elements 7 in particular can have other cross-sectional shapes, such as a cross-sectional shape having an inner diameter 8*a* becoming larger in the extracting direction. Analogously, retaining elements 7 can have a cross-sectional shape 8*c*, 8*d* having an essentially triangular notch. Alternatively, retaining elements 7 can have a cross-sectional shape having an essentially rectangular notch 8*f*. These notches can vary in shape and depth or even extend entirely through retaining elements 7 (cf. 8*e*).

Figure 8A:
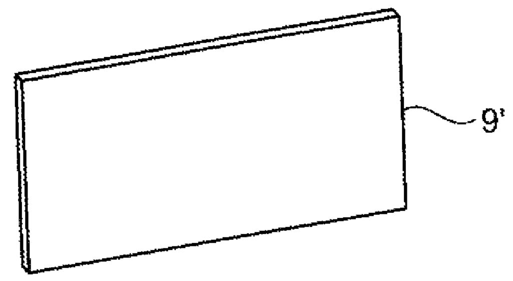
FIGS. 8*a* and 8*b* show a preferred embodiment of the retaining elements as a rolled or bent cylinder.
Figure 8B:
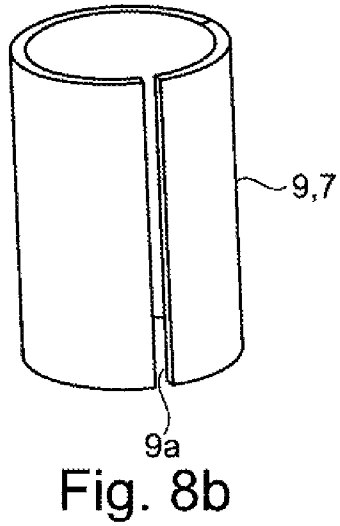

FIGS. 8*a*, 8*b* show a particularly preferred embodiment of retaining element 7 as a cylindrically bent or rolled sheet-metal part having a preferably consistent wall thickness. Sheet metal 9 is bent to desired cylindrical shape 9 (FIG. 8*b*) from an initially rectangular sheet 9' (FIG. 8*a*). Retaining element 7 created thus can have an opening 9*a* formed on the circumference due to production and surrounds permanent magnet elements 4 around a circumference of preferably 330°, more preferably at least 350°, most preferably 355°, in the inserted state in device 10.

Figure 9A:
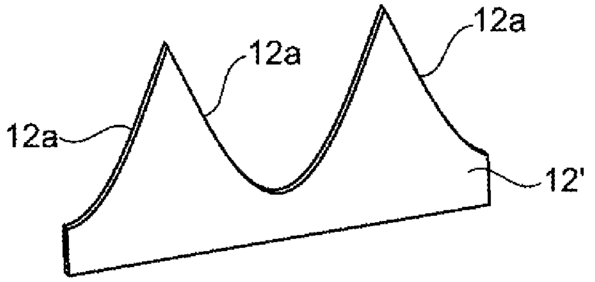
FIGS. 9*a* and 9*b* show a preferred embodiment of the retaining elements as a rolled or bent cylinder having at least two cutouts on the circumference.
Figure 9B:
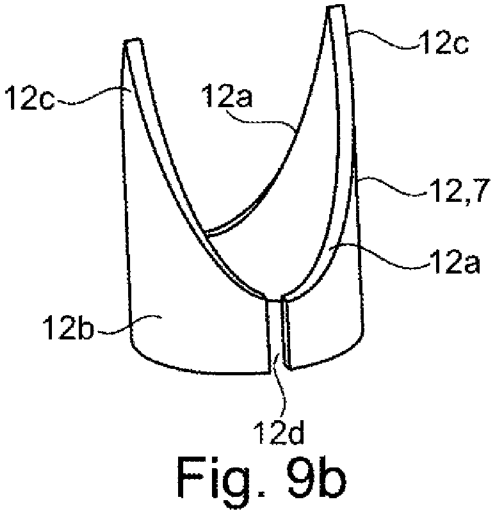

FIGS. 9*a*, 9*b* show an alternative embodiment of retaining element 7 as a cylindrically bent or rolled sheet-metal part 12 having varying cross-sectional shapes with respect to their circumference. In particular, sheet metal 12 preferably has at least two, preferably several, cutouts 12*a* or notches preferably of the same kind, which are dispersed around their circumference. These cutouts 12*a* or notches preferably have an essentially triangular shape in the unrolled state of sheet metal 12'. Through this, oblong bent crowns or protrusions 12*c* protruding from a cylindrical base body 12*b* are obtained in the rolled state. Analogously to the embodiment according to FIGS. 8*a*, 8*b*, retaining element 7 can have an opening on the circumference or a slit 12*d* extending axially.

Figure 9C:
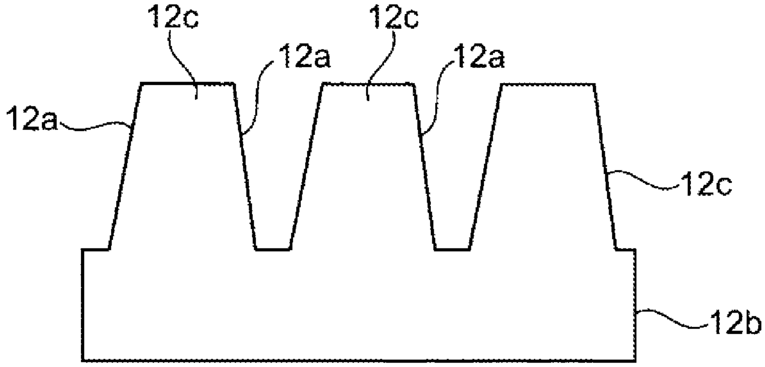
FIG. 9*c* shows a preferred embodiment of the retaining elements alternative to FIGS. 9*a*, 9*b*.

FIG. 9*c* shows a design of retaining element 7 alternative to the design of FIGS. 9*a*, 9*b*, the cutouts or notches 12*a* in retaining element 7 having a deviating, in particular trapezoidal shape. Through this, corresponding protrusions 12*c* are obtained.

The embodiments described above are merely exemplary, meaning the invention is in no manner limited to the embodiments shown in the figures. In particular, the shown embodiments can be combined with one another.

LIST OF REFERENCE NUMERALS

1 spool element
1*a* spool body
1*b* spool
2 core area
2*a* inner side core area
3 anchor unit
4 permanent magnet elements
4*a* permanent magnet discs
4*b, c* magnetically conductive discs
4*d* elevation
5 pestle
5*a* end section pestle
6 guide element
6*a* bore guide element
6*b* inner side guide element
7 retaining element
8 cross-sectional shape
8*a*-8*f* alternative cross-sectional shapes
9 sheet-metal part
9*a* circumferential opening
10 actuator
11 actuator, cam shaft
11*a* first guide groove, S-groove
11*b* second guide groove, X-groove
12 sheet-metal part with cutouts
12*a* cutout/notch
12*b* cylindrical base body
12*c* crown/protrusion
12*d* opening/slit
20 positioner
30 casing
30*a* cylindrical casing section
40 curve of dead embodiment according to FIG. 1-2
41 curve of dead embodiment according to FIG. 4
42 curve of live embodiment according to FIG. 4
A first actuating position
B second actuating position
C third actuating position
L longitudinal movement axis
H1 stroke section supporting extraction movement
H2 stroke section providing dampening
H3 stroke section homogeneous force potential
H4 stroke section attracting to actuating position B
H5 stroke section homogeneous extraction force
h1 height of retaining elements
h2 height of permanent magnet elements
d axial distance core area to retaining elements
d1 axial distance retaining elements to guide element
r radial distance retaining element and permanent magnet

The invention claimed is:

1. An electromagnetic actuator (10) comprising energizable stationary spool elements (1) having a stationary core area (2) assigned thereto, an anchor unit (3) which is moveable relative to the spool elements (1) and the core area (2) and has permanent magnet elements (4) and a pestle (5), the anchor unit (3) being moveable along a longitudinal movement axis (L) into at least two actuating positions (A,B), and the actuator (10) comprising retaining elements (7) which are spaced apart from the core area, are permanent-magnetically flux-conductive and are formed in such a manner-that, in a third actuating position (C) between the first and second actuating position (A,B) for interacting with the permanent magnet elements (4) of the anchor unit (3), the anchor unit (3) is retained in the third actuating position (C) between the first and second actuating position (A,B) and/or exerts a predefined force potential towards the actuating partner, and wherein the pestle (5) is disposed on one end of the anchor unit (3) and has a free end section (5*a*) for engaging in an actuating partner comprising a guide groove (11*a*, 11*b*) of a cam shaft (11).

2. The device according to claim 1, the anchor unit (3) being formed in such a manner for interacting with the spool elements (1) and the core area (2) that the anchor unit (3) is moved from the first actuating position (A) to the second or third actuating position (B,C), by choosing a corresponding duration of energization, as a reaction to a selective energization of the spool element (1).

3. The device according to claim 1, the third actuating position (C) being kept stable without energy in an unenergized state of the spool elements (1) via an interaction between the permanent magnet element (4) and the retaining elements (4).

4. The device according to claim 1, the retaining elements (7) being disposed between the first and second actuating position (A,B) and coaxially to the permanent magnet elements (4) along a movement section of the permanent magnet elements (4) along the longitudinal movement axis (L).

5. The device according to claim 1, the retaining elements (7) interacting with the permanent magnet elements (4) in such a manner that a movement of the anchor unit (3) along the longitudinal movement axis (L) from the first retracted actuating position (A) to the second extracted actuating position (B) when nearing or passing through the third actuating position (C) is dampened and/or stopped.

6. The device according to claim 1, the retaining elements (7) for interacting with the permanent magnet elements (4) of the anchor unit (3) being realized in such a manner that the anchor unit (3) exerts an essentially homogeneous force potential toward the actuating partner (11) via a predefined stroke section (H3) between the first and second actuating positions (A,B).

7. The device according to claim 6, the third actuating position (C) being located in the predefined stroke section (H3) and being defined by the engagement of the pestle (5) in a groove bottom (11*b*) of the actuating partner (11).

8. The device according to claim 6, the exerted force potential ranging from 0.5 N to 5 N.

9. The device according to claim 6, the predefined stroke section (H3) has a hub of 0.5 mm to 2.5 mm.

10. The device according to claim 1, the retaining elements (7) comprising an essentially cylindrical flux-conductive element having a constant inner diameter and outer diameter, which surrounds the permanent magnet elements (4) circumferentially in the third actuating position (C).

11. The device according to claim 1, the retaining elements (7) comprising an essentially cylindrical flux-conductive element having a constant outer diameter and varying inner contour, having an inner diameter becoming reduced in the direction of movement toward the second actuating position (B).

12. The device according to claim 1, the retaining elements (7) having an extension (h1) along the longitudinal movement axis (L) which is essentially the same or greater than the extension of the permanent magnet elements (4) towards the longitudinal movement axis (L).

13. The device according to claim 1, the radial distance (r) between an outer circumference surface of the permanent magnet elements (4) and an inner circumference surface of the retaining elements (7) being between 0.2 mm and 1.4 mm.

14. The device according to claim 1, the retaining elements (7) interacting in such a manner with the permanent magnet elements (4) that a movement of the anchor unit (3) along the longitudinal movement axis (L) from the first retracted actuating position (A) to the third intermediate actuating position (C) is supported and/or accelerated at least partially and along a predefined stroke section (H1) of the anchor unit (3).

15. The device according to claim 1, the device (10) not comprising energy storage means or spring elements between the anchor unit (3) and the core area (2).

16. The device according to claim 1, the device (10) comprising a guide element (6) which is disposed essentially opposite the core area (2), which is made of flux-conductive material and in which the anchor unit is guided by means of the pestle (5).

17. The device according to claim 16, the retaining elements (7) being at a distance to or adjacent to the guide element (6).

18. The device according to claim 1, the first retracted actuating position (A) being kept stable without energy via an interaction between the permanent magnet elements (4) and the core area (2) in the unenergized state of the spool element (1) and/or, the second extracted actuating position (B) being kept stable without energy via an interaction between the permanent magnet element (4) and a guide element (6) of the device (10) in the unenergized state of the spool element (1).

19. The device according to claim 1, the permanent magnet elements (4) having disc-shaped permanent magnets.

20. A system comprising an electromagnetic actuator according to claim 1 and an assigned actuating partner (11), comprising a sliding cam, comprising at least one first guide groove (11*a*), wherein the first guide groove (11*a*) is an S-groove, and a guide groove (11*b*), wherein the guide groove (11*b*) is an X-groove, which is positioned radially higher on the actuating partner in relation thereto.

21. The device according to claim 1, wherein the free end section (5*a*) is for engaging in an actuating partner comprising a guide groove (11*a*, 11*b*) of a cam shaft (11), and wherein the anchor unit (3) is movable along the longitudinal movement axis (L) into a first retracted actuating position (A) and a second extended actuating position (B).

* * * * *